Aug. 8, 1967  M. ZERBST  3,335,233
TRANSDUCER FOR CONVERTING MECHANICAL INTO
ELECTRICAL OSCILLATIONS
Filed Nov. 13, 1963
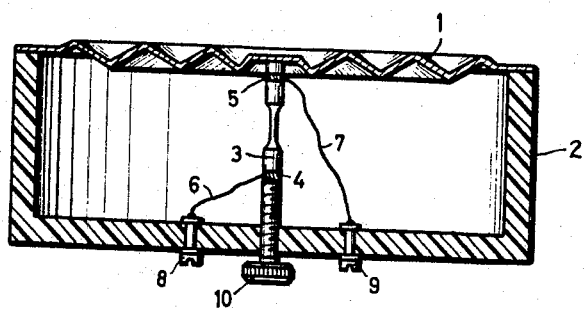

United States Patent Office 3,335,233
Patented Aug. 8, 1967

3,335,233
TRANSDUCER FOR CONVERTING MECHANICAL INTO ELECTRICAL OSCILLATIONS
Manfred Zerbst, Munich, Germany, assignor to Siemens & Halske Aktiengesellschaft, Berlin, Germany, a corporation of Germany
Filed Nov. 13, 1963, Ser. No. 323,313
Claims priority, application Germany, Nov. 15, 1962, S 82,451
11 Claims. (Cl. 179—110)

My invention relates to microphones, phonograph pickups and other transducers for converting mechanical into electrical oscillations.

It is well known that mechanical deflections can be converted to electrical signals with the aid of the piezoelectric effect of Rochelle salt crystals. Such transducer systems, when used as sonic pickups constitute high-ohmic components so as not to be suitable for direct coupling with transistors. Their capacitive character often results in an unsatisfactory frequency characteristic. The power output is limited because the entire output power must be generated mechanically. Also detrimental is the high sensitivity of such crystals to humidity.

It is an object of my invention to provide transducers for converting mechanical oscillations into corresponding alternating voltages that greatly minimize or eliminate the above-mentioned shortcomings, and nevertheless exceed in power output known ceramic piezoelectric transducers.

According to a feature of my invention, an elongated piezoresistive body of semiconductor material is connected at one end with a diaphragm or other mechanical member subject to vibrations that are to be transmitted to the semiconductor body for the purpose of deforming it and thereby varying its piezoresistance. The elongated semiconductor body, such as a rod of silicon or germanium, has two end portions between which a middle portion of reduced cross section is located so that the mechanical deformation and the electric resistance of the semiconductor body is determined essentially by the cross section of the middle portion. Furthermore, the contour of the reduced portion, formed by the tapering shape of the body from the thicker end portions toward the narrow or middle portion is gradual so that the buckling strength (according to Euler's column formula) is increased and relatively small forces acting in the axial direction of the elongated semiconductor body will produce discernible deformation and corresponding appreciable changes in electrical resistances.

According to another features of my invention, the elongated semiconductor body has its thicker end portions provided with contacts to supply an energizing direct current and to issue the alternating voltage resulting from the deforming oscillations imposed upon the rod-shaped body.

According to still another feature of my invention, it is preferable to adapt the stiffness of the rod-shaped semiconductor body to the stiffness of the microphone or other diaphragm, by varying the cross sections at the middle portion of the rod, in accordance with optimal power transmission from the diaphragm to the piezoresistive semiconductor body.

The invention will be further described with reference to an embodiment of a microphone illustrated by way of example in the accompanying drawing.

The device, shown in cross section, comprises a diaphragm 1 fastened peripherally to a microphone housing or capsule 2. Mounted between the center of the diaphragm 1 in the bottom of the housing 2 is a rod-shaped semiconductor body 3. This body extends perpendicularly to the diaphragm and is located approximately coaxial with the diaphragm axis. To permit proper adjustment, the connection between the capsule and the semiconductor body is effected by means of a set screw 10.

The semiconductor body 3, consisting for example of silicon of p conductivity type, has cylindrical shape of approximately 4 mm. length and about 0.5 mm. diameter in its thicker end portions. The middle portion of the rod has a smaller cross section over a length of about 1 mm. The diameter of the middle portion is less than 20 microns along the center longitudinal range of about 50 microns, whereas the upper and lower regions of the middle portion gradually merge toward the wider diameter of the thick end portions. Mounted on the end faces of the semiconductor rod 3 are contacts 4 and 5 which are joined with the semiconductor body by a barrier-free junction. The contacts 4 and 5 are connected by leads 6 and 7 respectively with externally accessible terminals 8 and 9 serving for supplying direct current during operation of the microphone and also for deriving the generated electric alternating voltage.

The invention is based upon the fact that the electric conductance in the semiconductor material is dependent upon the mechanical tension in the material. This effect is particularly pronounced in given directions of the monocrystal. For that reason it is preferable that the semi-conductor rod consist of a monocrystal and have the axis of its greatest piezoresistance effect coincide with the rod axis.

It is, therefore, advisable, when employing small silicon of n-conductivity type, to place the rod axis into the crystallographic 100-direction, and when employing silicon of p-conductivity type to place the rod axis into the crystallographic 111-direction. When germanium is used, the rod axis is preferably located in the 111-direction. In each case the crystal rods are to be produced or cut accordingly.

The piezoresistance effect of such material is very large in comparison with that of metals and results in a relative resistance change that may amount to about 150 times the relative change in length.

Suitable as semiconductor materials for transducers according to the invention are, in principle, all semiconductor materials applicable for electronic semiconductor purposes, such as for the production of transistors. However, the above-mentioned materials have been found particularly suitable. These are materials that have an anisotropic band structure, for example the so-called "many-valley" band structure of silicon of n-conductivity type.

In the simple band model, the energy of an electric charge carrier at the band edge is proportional to the square of the wave number $k$. This means that, for example, the energy minimum of the conductance band is located at the wave-number $k=0$. These semiconductors exhibit an only slight dependence of the resistance upon mechanical tensions.

With several semiconductors, including for example germanium and silicon, however, far greater dependence of the electric conductance upon mechanical tensions has been found than was expected from the simple band model. Investigation has shown that these effects result from a far more complicated structure, generally an anisotropic structure, for example the so-called "many-valley" band structure, of the conduction band. With such semiconductors the energy of the charge carriers is no longer dependent upon the wave number in accordance with a simple square law. Furthermore, the minima of the charge-carrier energy values are at wave-number values at which $k$ is not equal to zero.

For extrinsically conducting silicon there result four energy minima in the crystal directions 100, and with extrinsically conducting germanium there occur six minima in the crystal directions 111. Consequently when mechanical tensions are applied, the occupation densities of the different energy minima vary very greatly so that the conductance exhibits a correspondingly strong anisotropy and dependence upon pressure. The above-explained properties are thus utilized by virtue of the invention for transducers, especially for the conversion of sound and ultrasonics into electrical oscillations.

It is preferable to adapt the cross section F, the direct-current load J and the doping or specific resistances relative to each other such that for a given external force K there occurs an optimal voltage change ΔV. Generally the desired resistance of a transducer depends upon parameters of the external circuitry, for example to matching to an amplifier to which the transducer is to be connected. Consequently, as a rule, the electric resistance R of the semiconductor body in the transducer is determined by the external requirements. Consequently the cross section and the dopant concentration cannot be chosen independently of each other. The requirement for the highest feasible output voltage at a given mechanical force requires the smallest possible cross section on the one hand, whereas the necessity of dissipating the amount of Joule's heat resulting from the direct-current loading imposes a limitation upon the reduction in cross section.

Under these circumstances, the choice of suitable values results from the following equations.

$$\Delta = \frac{J}{F} \cdot \frac{G}{E} \cdot R \cdot K$$

$$R = \frac{L}{F} \rho$$

$$J = J_{max}$$

$$J_{max} = \sqrt{N_j/R}$$

wherein:

ΔV denoted the change in output voltage
J the direct current loading
F the cross section of the reduced middle portion
G the piezoresistive quality factor
E the modulus of elasticity
R the electric resistance
K the external mechanical force
L the axial length of the reduced middle portion
ρ the specific electric resistance
$J_{max}$ the maximal direct current determined by Joule's heat
$N_j$ the generated Joule's heat Considerable improvement in dissipation of Joule's heat is attained by keeping the length L of the reduced middle portion very short. The lower limit for the length L is essentially determined by the technical limitation inherent in preparing the semiconductor rod. That is, in practice, the length L of the reduced middle portion in the semiconductor rod cannot be made smaller, as a rule, than the diameter of the original rod or the diameter of the thicker end portions.

For avoiding buckling under pressure, it is of advantage to have the semiconductor body at the reduced middle portion uniformly change or taper from the wider to the narrower cross section on all sides.

Since the semiconductor materials in general are rather brittle, any surface faults, for example, cracks, would result in breaking under mechanical stresses. Thus, it is preferable that the semiconductor body have a smooth etched surface. For this purpose, it is of advantage to polish the semiconductor body chemically or electrolytically.

When producing the transducer according to the invention, it is, in practice, advisable to perform the last processing step, namely the reduction of the diameter for example from 50 microns down to about 10 microns, by means of an electrolytic method. When that has been done it is advisable to mount the semiconductor rod between diaphragm and capsule, free of mechanical tension.

While various embodiments of the invention have been described in detail it will be obvious to those skilled in the art that the invention may be practiced otherwise within its spirit and scope.

I claim:
1. In a transducer for converting mechanical into electrical oscillations comprising a vibratory mechanical member, an elongated piezoresistive semiconductor body connected with said member and deformable by longitudinal forces due to mechanical oscillations of said member, said body having two end portions and having a middle portion of smaller cross section than said end portions determining substantially the mechanical deformation and electric resistance of said semiconductor body, said respective end portions tapering toward said middle portion for increased buckling strength so that relatively small forces produce discernible deformations.

2. In a transducer for converting mechanical into electrical oscillations comprising a vibratory mechanical member, an elongated piezoresistive semiconductor body connected with said member and deformable by longitudinal forces due to mechanical oscillations of said member, said body having two end portions and having a middle portion of smaller cross section than said end portions determining substantially the mechanical deformation and electric resistance of said semiconductor body, said respective end portions tapering toward said middle portion for increased buckling strength so that relatively small forces produce discernible deformations, and terminal means connected to the end portions of said body for applying a direct current to said body and for deriving a fluctuating current therefrom.

3. In a transducer for converting mechanical into electrical oscillations comprising a vibratory mechanical member, an elongated piezoresistive semiconductor body connected with said member and deformable by longitudinal forces due to mechanical oscillations of said member, said body having two end portions and having a middle portion of smaller cross section than said end portions determining substantially the mechanical deformation and electric resistance of said semiconductor body, said respective end portions tapering toward said middle portion for increased buckling strength so that relatively small forces produce discernible deformations, said middle portion having cross-sectional dimensions such as to match the stiffness of the body to that of said vibratory mechanical member.

4. In a transducer for converting mechanical into electrical oscillations comprising a vibratory mechanical member, an elongated piezoresistive semiconductor body connected with said member and deformable by longitudinal forces due to mechanical oscillations of said member, said body having two end portions and having a middle portion of smaller cross section than said end portions determining substantially the mechanical deformation and electric resistance of said semiconductor body, said respective end portions tapering toward said middle portion for increased buckling strength so that relatively small forces produce discernible deformations, said elongated body consisting of a monocrystal having the axis of greatest piezoresistive effect coinciding with the axis of the elongated body.

5. In a transducer for converting mechanical into electrical oscillations comprising a vibratory mechanical member, an elongated piezoresistive semiconductor body connected with said member and deformable by longitudinal forces due to mechanical oscillations of said member, said body having two end portions and having a middle portion of smaller cross section than said end portions determining substantially the mechanical deformation and electric resistance of said semiconductor body, said respective end portions tapering toward said middle portion for increased buckling strength so that relatively small forces produce discernible deformations, said elongated body having a long axis and including a monocrystalline silicon of n conductivity type, said axis coinciding with the crystallographic 100-direction of said body.

6. In a transducer for converting mechanical into electrical oscillations comprising a vibratory mechanical member, an elongated piezoresistive semiconductor body connected with said member and deformable by longitudinal forces due to mechanical oscillations of said member, said body having two end portions and having a middle portion of smaller cross section than said end portions determining substantially the mechanical deformation and electric resistance of said semiconductor body, said respective end portions tapering toward said middle portion for increased buckling strength so that relatively small forces produce discernible deformations, said elongated body including a silicon monocrystal of p-conductivity type and having an axis along the crystallographic 111-direction of the monocrystal.

7. In a transducer for converting mechanical into electrical oscillations comprising a vibratory mechanical member, an elongated piezoresistive semiconductor body connected with said member and deformable by longitudinal forces due to mechanical oscillations of said member, said body having two end portions and having a middle portion of smaller cross section than said end portions determining substantially the mechanical deformation and electric resistance of said semiconductor body, said respective end portions tapering toward said middle portion for increased buckling strength so that relatively small forces produce discernible deformations, said elongated body including a germanium monocrystal and having a rod axis located in the crystallographic 111-direction.

8. In a transducer for converting mechanical into electrical oscillations comprising a vibratory mechanical member, an elongated piezoresistive semiconductor body connected with said member and deformable by longitudinal forces due to mechanical oscillations of said member, said body having two end portions and having a middle portion of smaller cross section than said end portions determining substantially the mechanical deformation and electric resistance of said semiconductor body, said respective end portions tapering toward said middle portion for increased buckling strength so that relatively small forces produce discernible deformations, the middle portion of smaller cross section of said body being doped and having a specific resistance to produce an optimal voltage change for a given external force.

9. In a transducer for converting mechanical into electrical oscillations comprising a vibratory mechanical member, an elongated piezoresistive semiconductor body connected with said member and deformable by longitudinal forces due to mechanical oscillations of said member, said body having two end portions and having a middle portion of smaller cross section than said end portions determining substantially the mechanical deformation and electric resistance of said semiconductor body, said respective end portions tapering toward said middle portion for increased buckling strength so that relatively small forces produce discernible deformations, said body having a doping and a cross section as well as a middle length corresponding to a predetermined input impedance of a following amplifier stage.

10. In a transducer for converting mechanical into electrical oscillations comprising a vibratory mechanical member, an elongated piezoresistive semiconductor body connected with said member and deformable by longitudinal forces due to mechanical oscillations of said member, said body having two end portions and having a middle portion of smaller cross section than said end portions determining substantially the mechanical deformation and electric resistance of said semiconductor body, said respective end portions tapering toward said middle portion for increased buckling strength so that relatively small forces produce discernible deformations, said middle portion having a length sufficiently small to cause absorption of the generated Joule's heat.

11. An elongated piezoresistive semiconductor body for a transducer for converting mechanical to electrical oscillations, said body being deformable by longitudinal forces, said body having two end portions and having a middle portion of smaller cross section than said end portions determining substantially the mechanical deformation and electric resistance of said semiconductor body, said respective end portions tapering toward said middle portion for increased buckling strength so that relatively small forces produce discernible deformations.

References Cited
UNITED STATES PATENTS

| | | | |
|---|---|---|---|
| 2,522,521 | 9/1950 | Kock | 179—121 |
| 3,009,126 | 11/1961 | Pfann | 338—5 |
| 3,215,568 | 11/1965 | Pfann | 148—33 |

KATHLEEN H. CLAFFY, *Primary Examiner.*

ROBERT MURRAY, *Examiner.*

F. N. CARTEN, A. McGILL, *Assistant Examiners.*